United States Patent
Luebben et al.

(10) Patent No.: US 10,300,923 B2
(45) Date of Patent: May 28, 2019

(54) DEVICE FOR STORING DATA IN A MOTOR VEHICLE

(71) Applicant: Robert Bosch GmbH, Stuttgart (DE)

(72) Inventors: Ralf Luebben, Osterode (DE); Klaus Schneider, Ludwigsburg (DE); Gafur Zymeri, Hannover (DE); Volker Blaschke, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 152 days.

(21) Appl. No.: 14/923,628

(22) Filed: Oct. 27, 2015

(65) Prior Publication Data

US 2016/0114810 A1   Apr. 28, 2016

(30) Foreign Application Priority Data

Oct. 28, 2014 (DE) .................. 10 2014 221 977

(51) Int. Cl.
   *G06F 13/20* (2006.01)
   *B60W 50/00* (2006.01)
   *H04W 4/04* (2009.01)

(52) U.S. Cl.
   CPC ............ *B60W 50/00* (2013.01); *H04W 4/046* (2013.01); *B60W 2050/0077* (2013.01); *B60W 2050/0082* (2013.01)

(58) Field of Classification Search
   None
   See application file for complete search history.

(56) References Cited

U.S. PATENT DOCUMENTS

| 8,705,527 | B1* | 4/2014 | Addepalli | H04W 4/046 370/389 |
| 2011/0103393 | A1* | 5/2011 | Meier | H04L 12/66 370/401 |
| 2012/0233447 | A1* | 9/2012 | Fitzgerald | G06F 8/36 713/1 |
| 2014/0154971 | A1* | 6/2014 | Tanaka | H04L 12/4625 455/7 |
| 2014/0297109 | A1* | 10/2014 | Shimomura | H04L 67/125 701/36 |
| 2015/0230044 | A1* | 8/2015 | Paun | H04W 4/008 455/41.2 |

FOREIGN PATENT DOCUMENTS

EP   0 694 840   1/1996

* cited by examiner

*Primary Examiner* — Ilwoo Park
(74) *Attorney, Agent, or Firm* — Norton Rose Fulbright US LLP; Gerard Messina

(57) ABSTRACT

In a method for storing data in a motor vehicle: an application software executed on a control device of the motor vehicle connects, via a communication network of the motor vehicle, to a data storage device of the motor vehicle; the application software logically connects the connected data storage device to the control device; the application software accesses the connected data storage device via the communication network, and the application software optionally releases the connected data storage device.

8 Claims, 1 Drawing Sheet

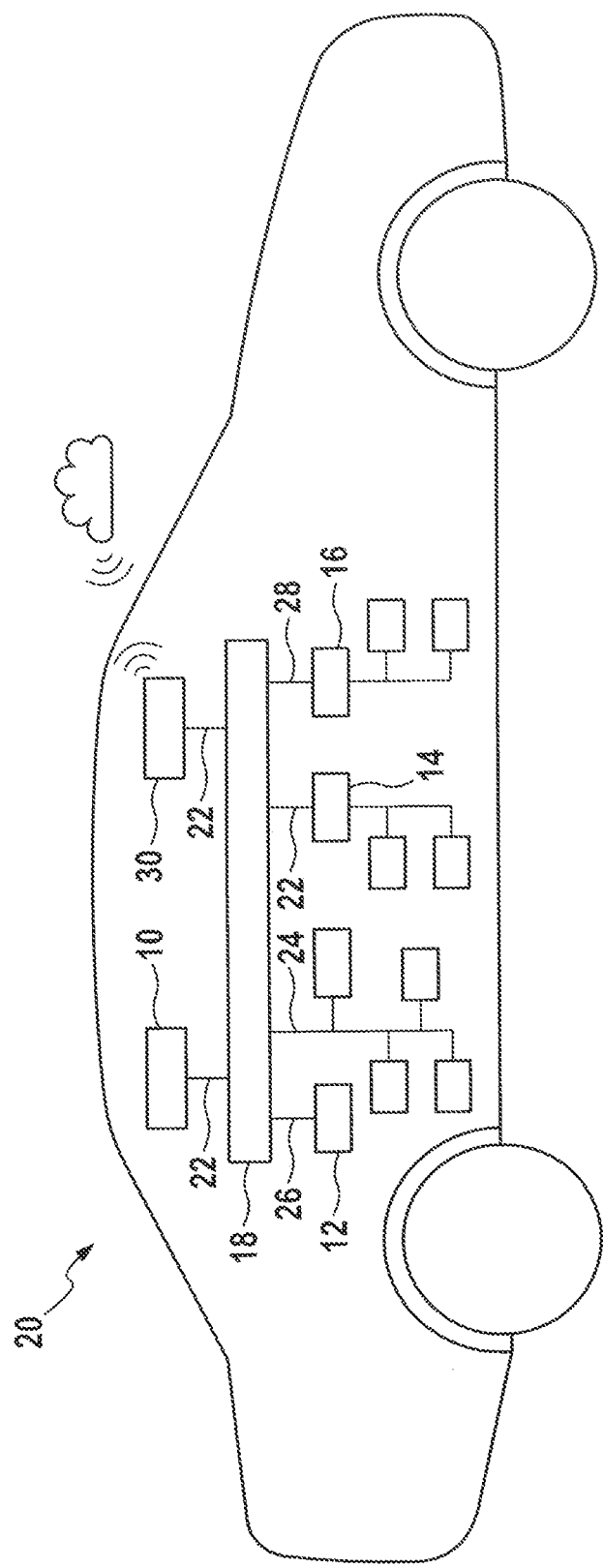

DEVICE FOR STORING DATA IN A MOTOR VEHICLE

BACKGROUND OF THE INVENTION

1. Field of the Invention

The present invention relates to a device and a method for storing data in a motor vehicle.

2. Description of the Related Art

Embedded systems for control and regulation are referred to in general as control devices in automotive electronics. Conventional control devices known from the existing art are as a rule equipped with a RAM or ROM memory device, but for the purpose of a possible change of configuration are usually equipped with an electrically erasable and programmable memory, a so-called EEPROM, designated a flash memory.

As a representative example of this type of system, European Patent EP 0694840 B1 discloses a motor vehicle control device that has a microcomputer having an electrically erasable and programmable memory. In the electrically erasable and programmable memory, a corresponding bit pattern is stored on at least one memory location for storing information. The entry to the memory location is monitored during operation. If the memory location is recognized as defective, a different memory location of the electrically erasable and programmable memory is selected for the storing of the information. The monitoring of the memory location is based on the fact that for the information at least one redundantly designed bit pattern is permissible, and that means are present that compare the memory content of the memory location with the permissible bit patterns.

If the memory content of the memory location for the storing of the information does not agree with one of the permissible bit patterns, the memory location is recognized as defective.

BRIEF SUMMARY OF THE INVENTION

The present invention provides a method for storing data in a motor vehicle, a corresponding device, a corresponding computer program, and a corresponding storage medium.

A basic idea of this solution is the opening up of storage devices that are available or distributed in the vehicle network for the control devices that are also connected to the vehicle network. In this way, the commonly used data storage device is available to said control devices for access and for use, in the manner of a local memory device.

Here, the data memory accessible via the vehicle network can assume the form of a storage medium integrated centrally in the vehicle network, or can be composed of released distributed memory devices of other domain control devices connected to the vehicle network. These include above all domain control devices from the infotainment domain, because there larger memory stores can be available. The suitability of such domain control devices for the described purpose exceeds that of typical embedded control devices, because bus communication systems are for the most part used to capacity, and the storage equipment of embedded control devices is currently standardly too small.

Alternatively, a plurality of storage locations is also possible, so that an optimal partitioning with regard to existing vehicle equipment variants and E/E architectures can be achieved.

A further advantage is the multiple usage of the same memory device thereby made possible, analogous for example to the multiple usage of a home network NAS by a multiplicity of applications. In this way, current map data, network caching, or software updates can easily be maintained within a vehicle without this storage unit having to be designed as the maximum of the individual applications.

The central or distributed memory can be achieved via the vehicle network for other control devices that in turn are connected and can communicate via various communication bus systems in the vehicle network, such as CAN, LIN, MOST, FlexRay, or Ethernet. In the simplest case, for this purpose the data memory device is connected to the gateway via Ethernet, and only control devices connected via Ethernet can access the data memory device using suitable NFS or SMB/CIFS protocols. Preferably, however, a service-oriented communication, e.g. SOME/IP, is used. Also conceivable is a storage region based on a data file system or based on a block memory, which can make use of the control devices by partitioning, boot loading, or mounting for data stores, or can be used for the starting up of an operating system.

Through the proposed data memory device, a wide variety of read-write error recognition, and possibly error removal, methods are enabled, or alternatively at least additional safety criteria are enabled for the error-free and/or error-recognizing and secure storage and transmission from and to the memory device. In this way, the memory device can also be used for safety-relevant tasks and data storage, and not only for safety-uncritical multimedia application purposes.

In addition, the data storage device ensures that for example data that is old and not required are deleted if particular preconditions for this exist, so that the data storage device is not unnecessarily occupied with data that are no longer required.

The use of a sufficiently large central data storage device for pure data storage makes it possible for example to store downloads of greater quantities of data there, and to buffer them there, if the storage volume of a local storage device is not sufficient as a storage location. In this way, local storage limitations are circumvented.

BRIEF DESCRIPTION OF THE DRAWING

The FIGURE shows the schematic diagram of a motor vehicle equipped with a device according to a specific embodiment of the present invention.

DETAILED DESCRIPTION OF THE INVENTION

The FIGURE illustrates the basic design of a motor vehicle 20 adapted for carrying out the proposed method. For this purpose, motor vehicle 20 is equipped with four communication networks 22, 24, 26, 28: an Ethernet 22, a Controller Area Network (CAN) 24, a media-oriented systems transport bus (MOST) 26, and a FlexRay bus 28. A first control device 12 is connected to a central gateway 18 via MOST bus 26, a second control device 14 is connected to the central gateway via Ethernet 22, and a third control device 16 is connected to the central gateway via the FlexRay bus 28, a data storage device 10 also being connected to the central gateway via Ethernet 22. A connectivity control unit 30, also connected to central gateway 18 by Ethernet 22, acts as a hardware platform for executing a transmission software that makes it possible to transmit data via the air interface (OTA) into motor vehicle 20, and to write it to data storage device 10. Further devices, not individually identified, are networked to central gateway 18 via Controller Area Network 24, Ethernet 22, or FlexRay 28.

For the functional explanation of the depicted device, a method for downloading data from the Internet is described as an example. For this purpose, an application software executed on second control device 14 is first connected via Ethernet 22 to data storage device 10, and connects this storage device logically to control device 14. The application software now asks the transmission software to transmit the data—for example designated by a Uniform Resource Locator (URL)—into motor vehicle 20 and to write it to data storage device 10. After the termination of the transmission process, the application software is able to gain read access, via the communication network, to connected data storage device 10 for the use of the written data, before the software releases the data storage device for use by other applications.

The connection of the application software to data storage device 10 takes place in the present example using the Internet protocol (IP). The logical connection of data storage device 10 is accomplished on this basis, preferably in the context of service-oriented communication (SOC) using the stated Internet protocol. A middleware suitable for this purpose for automotive control communication is known to those skilled in the art, for example under the product designation Scalable Service-Oriented Middleware over IP (SOME/IP).

What is claimed is:

1. A method for storing data in a motor vehicle having communications networks, the method comprising:
   connecting, via one of the communication networks within the motor vehicle, an application software executed on one of control devices within the motor vehicle to a data storage device within the motor vehicle;
   logically connecting, by the application software, the connected data storage device to the one of the control devices;
   after the connection of the data storage device, requesting, by the application software, a transmission software realized on a connectivity control unit within the motor vehicle to transmit data stored in a location external to the motor vehicle into the motor vehicle and to write the data to the data storage device;
   in response to the requesting, (i) transmitting, by the connectivity control unit, the data from the location external to the motor vehicle into the motor vehicle via an over-the-air (OTA) interface, and (ii) writing, by the connectivity control unit, the transmitted data to the data storage device;
   after the writing of the transmitted data, gaining read access to the data storage device by the application software; and
   after the gaining of the read access, reading, by the application software, the transmitted data from the data storage device, and using, by the application software, the read data;
   wherein the one of the control devices connects to the data storage device via a central gateway that is within the motor vehicle,
   wherein the data storage device is connected to the central gateway via the Ethernet, and
   wherein the connection of the application software to the data storage device takes place according to an Internet protocol implemented in the central gateway, and the logical connection of the connected data storage device to the control device takes place using Scalable service-Oriented MiddlewarE over IP (SOME/IP) in a service-oriented communication using the Internet protocol.

2. The method as recited in claim 1, wherein the communication network is one of the following field busses: a Controller Area Network, a MOST bus, or a FlexRay bus.

3. The method as recited in claim 1, wherein the data storage device is distributed over a plurality of domain control devices of the motor vehicle, networked via the communication network.

4. The method of claim 1, wherein the one of the communication networks is: (i) an Ethernet, or (ii) a Controller Area Network (CAN), or (iii) a media-oriented systems transport (MOST) bus, or (iv) a FlexRay bus, wherein the connectivity control unit is connected to the central gateway by the Ethernet, and wherein further devices are networked to the central gateway via one of the CAN, the Ethernet, or the FlexRay bus.

5. A device for storing data in a motor vehicle having communication networks, comprising:
   a control unit, including a processor, configured to perform the following:
      connecting, via one of the communication networks within the motor vehicle, an application software executed on the control unit to a data storage device within the motor vehicle, the control unit being within the motor vehicle;
      logically connecting, by the application software, the connected data storage device to the control unit;
      after the connection of the data storage device, requesting, by the application software, a transmission software realized on a connectivity control unit within the motor vehicle to transmit data stored in a location external to the motor vehicle into the motor vehicle and to write the transmitted data to the data storage device wherein the connectivity control unit, in response to the requesting: (i) transmitting the data from the location external to the motor vehicle into the motor vehicle via an over-the-air (OTA) interface, and (ii) writing the transmitted data to the data storage device; and
      after the writing of the transmitted data by the transmission software, gaining read access to the data storage device by the application software;
      after the gaining of the read access, reading, by the application software, the transmitted data from the data storage device, and using, by the application software, the read data; and
      after the reading, releasing the connected data storage device by the application software;
      wherein the control unit connects to the data storage device via a central gateway that is within the motor vehicle,
      wherein the data storage device is connected to the central gateway via the Ethernet, and
      wherein the connection of the application software to the data storage device takes place according to an Internet protocol implemented in the central gateway, and the logical connection of the connected data storage device to the control device using Scalable service-Oriented MiddlewarE over IP (SOME/IP) in a service-oriented communication using the Internet protocol.

6. The device of claim 5, wherein the one of the communication networks is: (i) an Ethernet, or (ii) a Controller Area Network (CAN), or (iii) a media-oriented systems transport (MOST) bus, or (iv) a FlexRay bus, wherein the connectivity control unit is connected to the central gateway by the Ethernet and wherein further devices are networked to the central gateway via one of the CAN, the Ethernet, or the FlexRay bus.

7. A non-transitory, computer-readable data storage medium storing a computer program, which is executable on a processor, comprising:
 a program code arrangement having program code for storing data in a motor vehicle having communication networks, by performing the following:
  connecting, via one of the communication networks within the motor vehicle, an application software executed on a control device within the motor vehicle to a data storage device within the motor vehicle;
  logically connecting, by the application software, the connected data storage device to the control device; and
  after the connection of the data storage device, requesting, by the application software, a transmission software realized on a connectivity control unit within the motor vehicle to transmit data stored in a location external to the motor vehicle into the motor vehicle and to write the data to the data storage device, wherein the connectivity control unit, in response to the requesting: (i) transmitting the data from the location external to the motor vehicle into the motor vehicle via an over-the-air (OTA) interface, and (ii) writing the transmitted data to the data storage device;
  after the writing of the data by the transmission software, gaining read access to the data storage device by the application software; and
  after the gaining of the read access, reading, by the application software, the transmitted data from the data storage device, and using, by the application software, the read data;
 wherein the control device connects to the data storage device via a central gateway that is within the motor vehicle,
 wherein the data storage device is connected to the central gateway via the Ethernet, and
 wherein the connection of the application software to the data storage device takes place according to an Internet protocol implemented in the central gateway, and the logical connection of the connected data storage device to the control device using Scalable service-Oriented MiddlewarE over IP (SOME/IP) in a service-oriented communication using the Internet protocol.

8. The data storage medium of claim 7, wherein the one of the communication networks is: (i) an Ethernet, or (ii) a Controller Area Network (CAN), or (iii) a media-oriented systems transport (MOST) bus, or (iv) a FlexRay bus, wherein the connectivity control unit is connected to the central gateway by the Ethernet and wherein further devices are networked to the central gateway via one of the CAN, the Ethernet, or the FlexRay bus.

* * * * *